(No Model.)

H. V. HARTZ.
STOP CLUTCH.

No. 424,478. Patented Apr. 1, 1890.

WITNESSES,
N. S. Amstutz
J. L. Burg

Henry V. Hartz INVENTOR.
By
H. J. Fisher
ATTORNEY.

UNITED STATES PATENT OFFICE.

HENRY V. HARTZ, OF CLEVELAND, OHIO.

STOP-CLUTCH.

SPECIFICATION forming part of Letters Patent No. 424,478, dated April 1, 1890.

Application filed May 31, 1889. Serial No. 312,757. (No model.)

*To all whom it may concern:*

Be it known that I, HENRY V. HARTZ, a citizen of the United States, residing at Cleveland, in the county of Cuyahoga and State of Ohio, have invented certain new and useful Improvements in Stop-Clutches; and I do hereby declare that the following is a full, clear, and exact description of the invention which will enable others skilled in the art to which it appertains to make and use the same.

My invention relates to improvements in stop mechanism; and the object of the invention is to provide stop mechanism for machinery where only one or more revolutions are required at a time, and which will make strong and positive engagement when connected for work, and will be noiseless when the power is running idle, all as hereinafter described, and fully pointed out in the claims.

Figure 2:
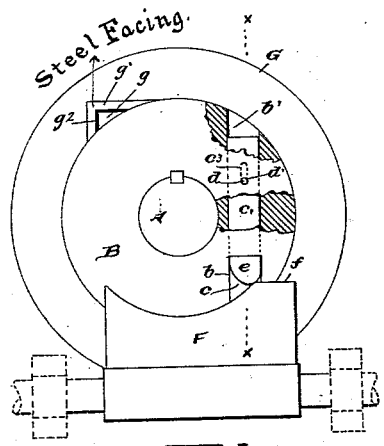
Figure 1:
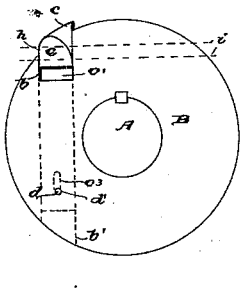
Figure 3:
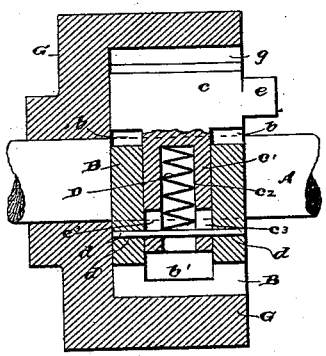
Figure 4:
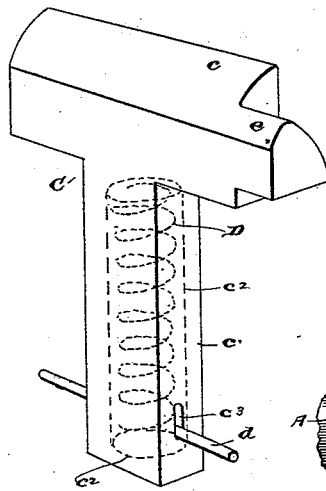
Figure 5:
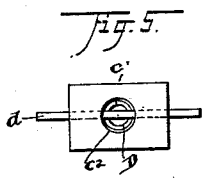
Figure 6:
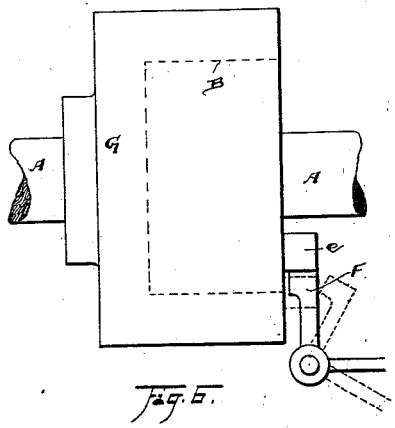
Figure 7:
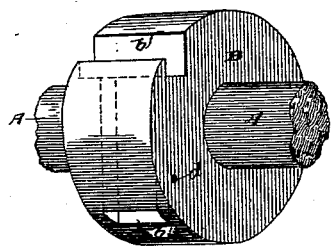

Referring to the drawings, Figure 1 is a side elevation of the collar on the drive-shaft, with the head of the dog in full lines at one side. Fig. 2 is a side view of the collar shown in Fig. 1, the driver over the collar, and the trip, and Fig. 3 is a sectional view on line $x$ $x$, Fig. 2, in reversed position. Fig. 4 is a perspective of the dog, and Fig. 5 is a bottom view of the stem of the said dog with the spring and cross-rod in position. Fig. 6 is an edge view of the driver in position on the collar, and showing the relation of the trip to the same when raised to engage the projection on the head of the dog. Fig. 7 is a perspective of the collar, showing the cross-slot therein.

A represents a shaft which carries a collar B, solid therewith or keyed or otherwise firmly secured thereon. This collar has an angular recess or slot $b$ cut across its periphery on lines which intersect the periphery of the collar on the same side of the shaft as the slot and about one-third the distance round the collar. A central opening $b'$, either circular or angular, extends through the collar on the lines indicated and enters the middle of the recess. Thus the recess and opening together form a T shape, and are designed to receive the T-shaped dog C. (Seen clearly in Fig. 4.) The head $c$ and stem $c'$ of the dog fit in the recess and opening in the collar B, and have a limited sliding movement therein. The head $c$ is cut away transversely on its upper surface on curved lines corresponding to the curvature of the periphery of the collar, so that when the said head is depressed in the recess $b$ a smooth outer surface will be obtained, the same as if the collar were solid at this point. The head $c$ in that case would bridge the recess $b$ with its curved surface on the radius of the collar, while its stem would be correspondingly depressed in the opening $b'$ beneath the recess. The stem $c'$ serves in part as a guide for the head of the dog and as means to operate the same, and for the latter purpose it has a bore $c^2$ centrally from the bottom, in which is placed a spring D. The spring D, somewhat compressed, rests on a cross rod or bar $d$, which extends through transverse holes $d'$ of the same size as the cross-rod in the collar A and through the oblong opening or slot $c^3$ in the lower end of stem $c'$. The length of the slot $c^3$ is proportioned to the sliding movement of the dog, and the upward movement of the dog is limited by the cross-rod in said slot. Normally, then, the dog C would be constantly projected by the pressure of spring D beyond the periphery of the collar the limit of the slot—say half an inch or more—if no mechanism existed to depress the dog and control its position, and this is the position of the dog at work; but in order to hold the dog out of engagement with the driver when movement is not wanted I form a lateral extension $e$ on the head of the dog, which projects beyond the side of the collar and drive-wheel and is beveled or cut away on its exposed side on a more or less curved line to make easy sliding engagement with the trip or catch F, pivoted on the machine or other suitable support at one side of the collar B. The trip or catch F has a square shoulder $f$ at one end and a concave edge beyond the shoulder corresponding in curvature to the periphery of the collar, or nearly so. This concave edge is of such height and the trip is so arranged with reference to the collar that when the dog comes round, as in action, and the extension $e$ strikes the shoulder $f$ the dog will be pressed back by such contact, so as to wholly disengage it from the drive-wheel. This disengagement occurs when the extension $e$ rides into the concave edge $f'$, and the power being removed the machine will stop, say as seen in Fig. 2. Thus it will remain until the trip or catch F is swung back on its pivots by the operator, as seen in dotted lines, Fig. 6, when the spring D at once asserts itself and forces the head of the dog out, as seen in Fig. 1. This leaves the dog free to be engaged by the driver G when the driver comes round. To make this engagement, the driver is provided with an angular recess $g$ on its inside, and this recess is fitted with a steel facing $g'$, adapted to the recess and designed to take the wear that otherwise would come directly on the driver. The angle of the facing $g'$ corresponds exactly to the angle of the cross-head of the dog, so that when engagement occurs between these parts the shoulder $g^2$ of the facing $g'$ will come flat up against the exposed edge $h$ of the dog-head. This first of all makes a positive engagement, from which there can be no possible release, except by withdrawal of the dog, as above described. In the next place it affords a bearing for the driver which is as firm as the collar itself.

The dotted lines $i$, Fig. 1, show the lines of pressure when the parts are locked. The direction of these lines, it will be seen, is within the periphery of the collar at right angles to the engaged faces, which gives such powerful backing to the dog that breakage at this point is impossible. The pressure side of the recess comes so high that it extends above the direct pressure-line of the driver, so that there is no unsupported pressure at all, and none that does not come within the periphery of the pulley. This is an important feature of the invention, and one that is believed to be broadly new. Yet notwithstanding this advantage the dog can be instantly withdrawn from the driver at the completion of any number of revolutions, and so held that it will be noiseless and wholly out of the way. The sides of the transverse recess in the collar are parallel, and as both sides or walls extend down to the same plane with respect to the axis of the collar the inner or pressure side of the recess nearest the axle is as much deeper than the outer side as the rise in the curvature of the periphery between said sides when measured from the base of the recess. This gives the exposed portion of the pressure side indicated between the lines $i$ on lines extending through from the point of actual pressure by the driver. Both the higher and lower sides of the dog extend an equal distance above the periphery of the collar when locked with the driver; but in the nature of things there can be no bearing for the dog above the periphery of the collar, and the pressure in fact is compelled to rest against the collar in about the direction indicated by the lines $i$.

The driver or drive gear or pulley G is fitted on the shaft and the collar, but might be fitted on the collar alone or the shaft alone.

The operation is as follows: Assuming that the parts are in the position shown in Fig. 2, and it is desired to make engagement with the driver, the trip or catch F is swung out on its pivots, which may be done by hand or treadle connections. The head of the dog will then ride against the inside of the driver till it reaches the angular recess therein, when the dog will immediately drop into said recess and be carried round with the collar one or more revolutions and until the trip is again raised to a vertical position. This done, the extension $e$ on the dog-head will strike the square shoulder on the top of the trip, and the dog will be wholly withdrawn when the parts reach their original position, as seen in Fig. 2.

If desired, the T-dog may have an extension on each side, instead of one only, and a trip or catch to engage each extension. It should be further understood that the dog may extend through the collar or wheel in which it is supported on the lines shown or on other lines—as, for example, through the center of the collar and the shaft; but this would not be as convenient or as good a construction as the one shown and described.

Other changes and variations in the device may be made without departing from the spirit of the invention.

Having thus described my invention, what I claim as new, and desire to secure by Letters Patent, is—

1. In stop mechanism, a collar rigid with the shaft and having a transverse slot across its periphery and an opening from the center of said slot through to the periphery of the collar directly opposite the slot and a dog in said recess and opening, substantially as set forth.

2. In stop mechanism, a collar having an angular recess cut across its edge on lines which extend across the collar at one side of the axial center, an opening through the collar on said lines, and a dog, substantially as set forth.

3. In stop mechanism, a collar provided with a T-shaped recess and an opening constructed to receive a sliding dog, in combination with a dog in the recess, substantially as set forth.

4. In stop mechanism, a collar having a transverse angular recess in its periphery, the sides of the recess being substantially parallel and of different depths, and an opening through the collar from said recess and in line with the sides thereof, substantially as set forth.

5. In stop mechanism, a collar having a recess cut across its periphery, the sides of which are of different depths, in combination with a dog having its outer surface curved to correspond to the periphery of the collar, substantially as set forth.

6. In stop mechanism, a collar having a recess across its periphery and an opening extending from the recess to the periphery opposite thereto, in combination with a dog set in said recess and opening and a spring and stop connected with the dog, whereby the dog is forced out and held within certain limits, substantially as set forth.

7. In stop mechanism, a collar fixed on the shaft, a dog set transversely in said collar, a spring within the collar to force the dog outward, and a stop in the collar to limit the outward movement of the dog, substantially as set forth.

8. In stop mechanism, a collar having a T-shaped dog set therein, a spring in the stem of the dog, and a cross-rod through a slot in the stem, substantially as set forth.

9. In stop mechanism, a collar fixed on the shaft and having a dog set in a recess in the collar at right angles to the axis of the shaft, said dog provided with a laterally-extending portion, in combination with a trip or catch arranged to engage said extension, substantially as set forth.

10. In stop mechanism, a collar, a dog adjustable in said collar and having an extension at one side, in combination with a catch at the side of the collar and arranged to engage said extension, said catch having a shoulder and curved edge, substantially as set forth.

11. In stop mechanism, a collar having a dog movable therein, a spring to force the dog outward, and a stop connected with the dog to limit the movement thereof, in combination with a catch or trip pivoted at the side of the collar to force and hold the dog out of engagement and a driver over said dog, substantially as set forth.

12. In stop mechanism, a collar secured to the shaft and having a recess across its edge and an opening leading from said recess to the periphery of the collar opposite, a dog set in said recess and opening, and a driver outside of the collar provided with a seat to engage the dog, substantially as set forth.

13. In stop mechanism, a collar having a recess across its periphery, the sides of which are parallel and the inner or pressure side deeper than the outer side, a movable dog fitting said recess, and a driver over the collar having a seat with a face to engage the plain face of the dog opposite its pressure side, substantially as set forth.

14. In stop mechanism, a collar provided with a dog having parallel sides of different depths and the surface between said sides rounded to conform to the periphery of the collar, in combination with a driver having a seat on its inner portion to engage said dog, substantially as set forth.

15. The combination of a collar having a T-shaped recess and opening, a T-shaped dog movable therein, a catch to engage and disengage the dog, and a driver having a seat to engage the head of the dog, substantially as set forth.

16. In stop mechanism, a pivoted trip having its edge concentric to the drive-shaft, in combination with the drive-shaft, a collar on the shaft, and a dog in said collar arranged to slide at right angles to the shaft and having a projection engaged by the trip when in working position.

In testimony whereof I hereunto set my name.

HENRY V. HARTZ.

Witnesses:
IRENE L. COREY,
H. T. FISHER.